United States Patent [19]
Tsai

[11] Patent Number: 5,165,711
[45] Date of Patent: Nov. 24, 1992

[54] SKATEBOARD WITH STEERING WHEEL

[76] Inventor: Tung-Ta Tsai, No. 49, Fu Hsing Str., Yi Chia Tsun, Jen Te Hsiang, Tainan Hsien, Taiwan

[21] Appl. No.: 792,831

[22] Filed: Nov. 15, 1991

[51] Int. Cl.⁵ .............................................. B62M 1/00
[52] U.S. Cl. ................................................. 280/87.041
[58] Field of Search ....................... 280/87.041, 87.042

[56] References Cited
U.S. PATENT DOCUMENTS

D. 95,770  5/1935  Mellon ............................ 280/87.041
2,222,678  11/1940  Mittelburg ..................... 280/87.041

FOREIGN PATENT DOCUMENTS 2614002  10/1988  France ............................ 280/87.041

Primary Examiner—David M. Mitchell
Attorney, Agent, or Firm—Varndell Legal Group

[57] ABSTRACT

A skateboard with steering wheel for steering control, the body of which having two opposite holes at the front biased inward from a transverse line through 4-5 angle for fastening two front wheels by two wheel holders, and two ring-shaped members for fastening two rear wheels by two wheel hubs and a wheel axle. A steel tube is fastened in a tubular seat on the body of the skateboard and rotated by a steering wheel two turn the front wheels by a link for steering control.

1 Claim, 4 Drawing Sheets

SKATEBOARD WITH STEERING WHEEL

BACKGROUND OF THE INVENTION

The present invention relates to skateboards and relates more particularly to a skateboard with a steering wheel for steering control which has means to prevent an user from jamming the fingers or the toes.

Conventionally, a skateboard is simply made from a flat board mounted on rollers for riding. This simple structure of skateboard is not easy to control its steering direction. Recently, several skateboard manufacturers have tried to fasten a steering wheel in a skateboard for easy steering control. However, these structures are still not satisfactory in use because there are gaps left between the board and the two front wheels thereof. During riding, a player tends to jam one's toes or fingers in the gaps.

SUMMARY OF THE INVENTION

The present invention has been accomplished to eliminate the aforesaid problems. It is therefore an object of the present invention to provide a skateboard which has a steering wheel for easy steering control. It is another object of the present invention to provide a skateboard which is safe in use.

According to the present invention, there is provided a skateboard with steering wheel which is generally comprised of a body having two front wheels secured in place by two wheel holders, two rear wheels secured in place by a wheel axle and two wheel hubs, and a steering wheel connected to said front wheels by a link and a steel tube. Rotating the steering wheel causes the link to turn the front wheels from one direction to another. By means of the arrangement of the wheel holders, turning the front wheels does not produce gaps between the body and the front wheels. Therefore, jamming accident is eliminated.

DETAILED DESCRIPTION OF THE PREFERRED EMBODIMENT

Figure 1:
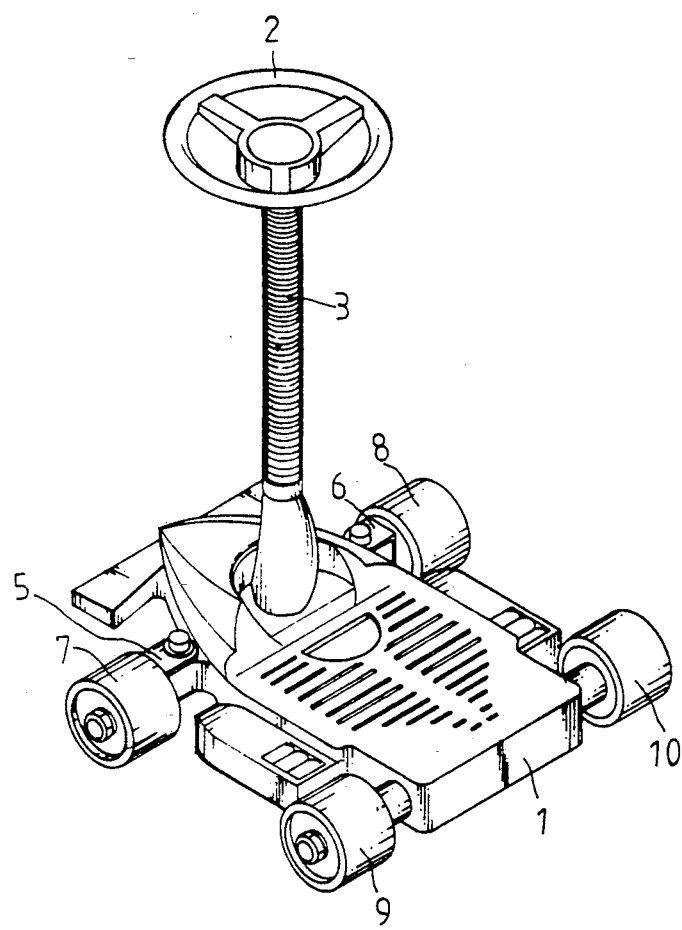
FIG. 1 is a perspective view of a skateboard embodying the present invention.
Figure 2:
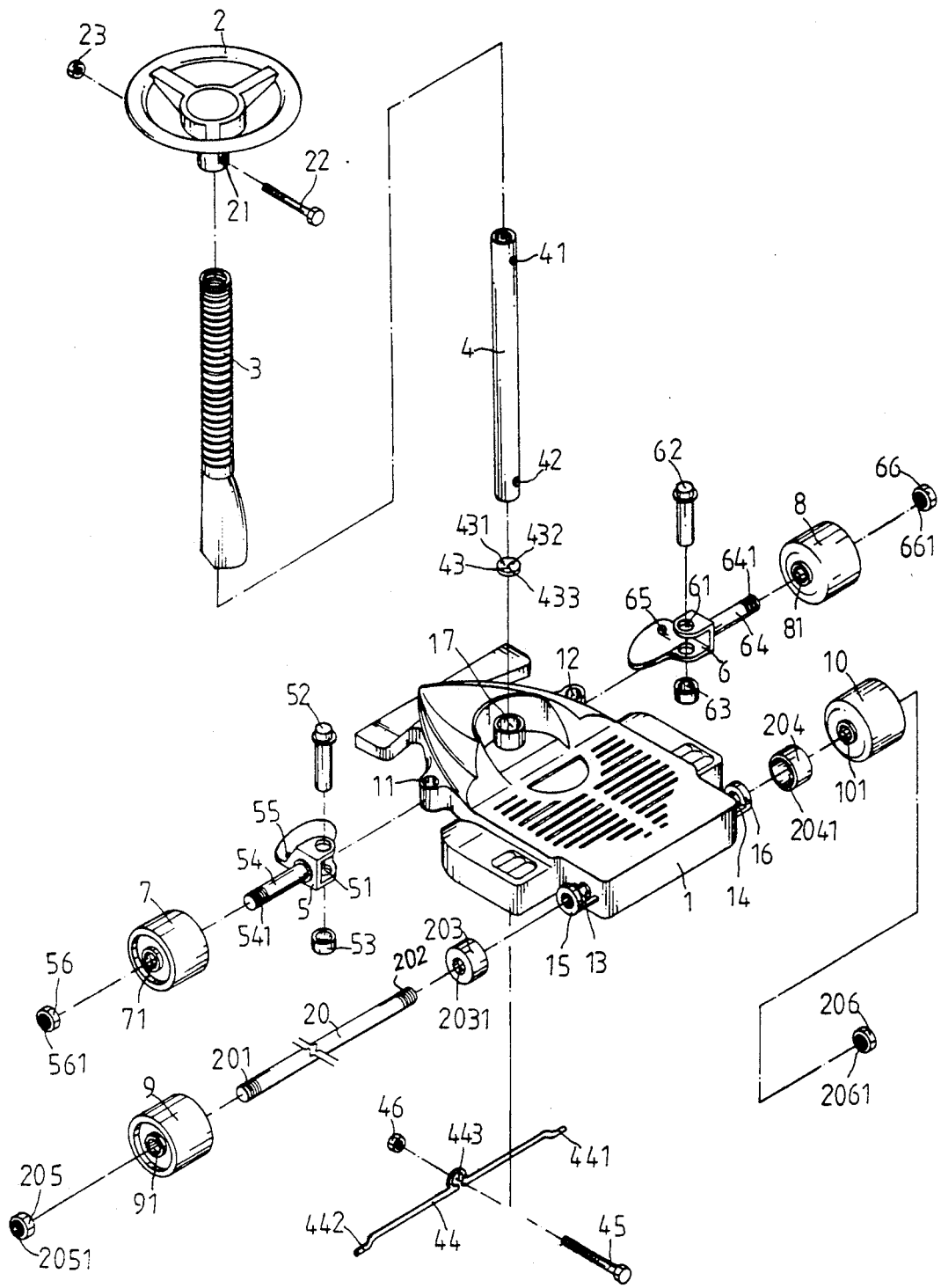
FIG. 2 is an exploded perspective view thereof.

Referring to FIGS. 1 and 2, a skateboard as constructed in accordance with the present invention is generally comprised of a body 1, a steering wheel 2, a bellows pipe 3, a steel tube 4, two wheel holders 5, 6, two front wheels 7, 8, two rear wheels 9, 10, and a wheel axle 20.

Figure 6:
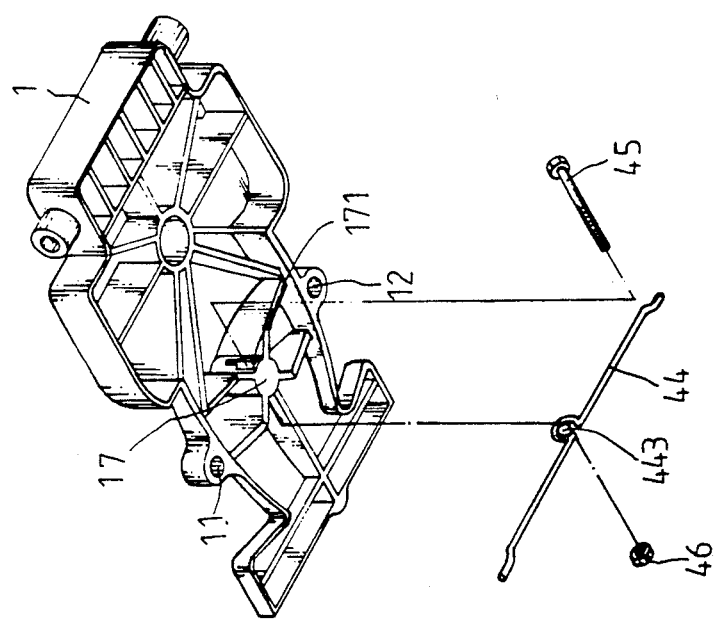
FIG. 6 is an exploded bottom view of the body and the link.

The body 1 has a first pair of holes 11, 12 bilaterally disposed at one end in vertical direction for fastening the two front wheels 7, 8 by the two wheel holders 5, 6, a second pair of holes 13, 14 and a pair of ring-shaped members 15, 16 bilaterally disposed at an opposite end in horizontal direction for fastening the two rear wheels 9, 10 by the wheel axle 20, a tubular seat 17 vertically disposed at the middle in line with said first pair of holes 11, 12 for fastening the steering wheel 2 by the steel tube 4 and the bellows pipe 3, which tubular seat 17 has a hole 171 adjacent to the bottom edge thereof (see FIG. 6).

Figure 3:
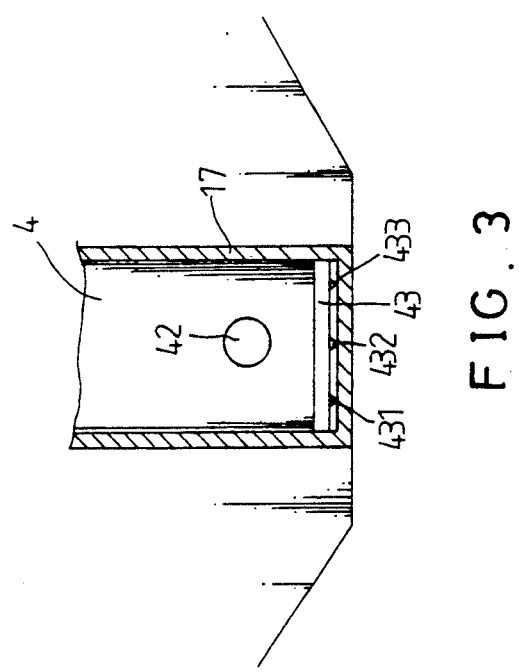
FIG. 3 is a sectional view of the tubular seat showing that the steel tube is stopped against the metal plate, and the metal plate has toothed projections engaged in the top surface of the bottom edge of the tubular seat.

The steering wheel 2 has a through-hole 21 at the bottom for fastening the steel tube 4. The steel tube 4 has two pivot holes 41, 42 at two opposite ends. Once the steel tube 4 is inserted into the bellows pipe 3, it is secured to the steering wheel 2 by a screw 22, which is inserted through the through-hole 21 and the pivot hole 41, and a locknut 23. The opposite end of the steel tube 4 is inserted into the tubular seat 17 and secured in place by a screw 45 and a locknut 46. While fastening the screw 45 and the locknut 46, a link 44 is simultaneously secured to the tubular seat 17 beneath the body 1. The link 44 has an arched hole 443 at the middle through which the screw 45 is inserted. Further, before inserting the steel tube 4 into the tubular seat 17, a metal plate 43, is fastened inside the tubular seat 4. The metal plate 43 has three toothed projection 431, 432, 433 formed through the process of punching and is provided to prohibit the steel tube 4 from rotating the tubular seat 17 when the steel tube 4 is rotated by the steering wheel 2 (see FIG. 3).

Figure 7:
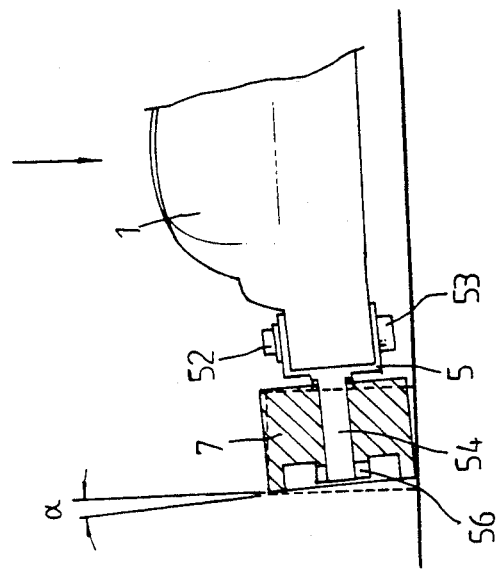
FIG. 7 is a partly sectional view showing that the wheel holder is tilted inward through an angle "α".

The two wheel holders 5, 6 each has a hole 51 or 61 fastened to the hole 11 or 12 on the body 1 by a bolt 52 or 62 and a locknut 53 or 63, a recessed hole 55 or 65 at a suitable location into which either end 442 or 441 of the link 44 is engaged, and an axle 54 or 64 for holding either front wheel 7 or 8. The axle 54 or 64 of either wheel holder 5 or 6 has an outer thread 541 or 641 engaged with the inner thread 561 or 661 on a locknut 56 or 66 to retain the front wheel 7 or 8 in place. The two holes 11, 12 on the body 1 are respectively biased inward from a transverse line through 4° to 5° angle (see the angle α in FIG. 7). Therefore, the two wheel holders 5, 6 are slightly tilted inward after mounting. This special design prohibits the front wheels 7, 9 from being caused to tilt outward.

The wheel axle 20 has two outer threads 201, 202 at two opposite ends. When two wheel hubs 203, 204 are respectively mounted on the two ring-shaped members 15, 16, the wheel axle 20 is inserted through the two center holes 91, 101 of the two rear wheels 9, 10, the center holes 2031, 2041 on the two wheel hubs 203, 204, the two ring-shaped members 15, 16 and the second pair of holes 13, 14 on the body 1 with the two outer threads 201, 202 thereof respectively engaged into the inner threads 2051 on two locknuts 205, 206.

Figure 4:
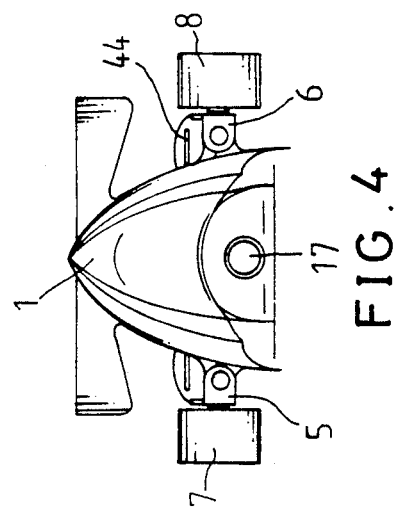
FIG. 4 is a partly top view of the skateboard showing the status of the front wheels and the wheel holders when the skateboard is moving forward.
Figure 5:
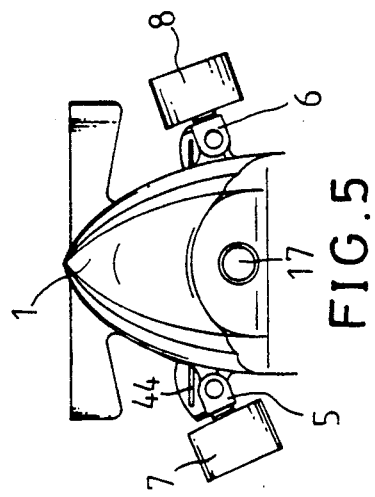
FIG. 5 is another partly top view of the skateboard showing the status of the front wheels and the wheel holders when the skateboard is turned leftward.

Referring to FIGS. 4 and 5, during skating, both hands are held on the steering wheel 2 with one leg stepped on the body 1 and the other leg pushed against the ground in reverse direction to move the skateboard forward. By rotating the steering wheel 2, the moving direction of the skateboard is controlled. While turning the front wheels 7, 8 from one direction to another, no gaps will be produced between the front wheels 7, 8 and the body 1. Therefore, a player will not jam one's fingers or toes in the front wheels during skating.

I claim:

1. A skateboard with steering wheel, comprising:

a body having a first pair of holes bilaterally disposed at one end in vertical direction, a second pair of holes and a pair of ring-shaped members transversely aligned at an opposite end, and a tubular seat vertically disposed at the middle in line with said first pair of holes, said tubular seat having a closed bottom edge, a first hole in longitudinal direction, a second hole in transverse direction;

a steel tube inserted into the first hole on said tubular seat, said steel tube having a first pivot hole at one end and a second pivot hole at an opposite end, said second pivot hole being secured to the second hole on said tubular seat by a screw and a locknut;

a bellows pipe sleeved on said steel tube;

a steering wheel mounted on said steel tube at the top, said steering wheel having a pivot hole at the bottom secured to the first pivot hole on said steel tube by a screw and a locknut;

a metal plate inserted inside said tubular seat stopped against said steel tube, said metal plate having toothed projections engaged in the top surface of the closed bottom edge of said tubular seat;

two wheel holders respectively mounted on said first pair of holes on said body, said wheel holders each having a hold fastened in either of said first pair of holes by a bolt and a locknut, a recessed hole at a suitable location, and an axle;

two front wheels respectively mounted on the axle of either of said wheel holders and secured in place by locknuts;

a link secured to said steel tube, said link having two opposite ends respectively engaged into the recessed hole on either of said wheel holders;

a wheel axle inserted through said pair of ring-shaped members and said second pair of holes on said body to hold two wheel hubs;

two rear wheels mounted on said wheel axle at two opposite ends and secured in place by locknuts; and wherein said first pair of holes on said body are respectively biased inward from a transverse line through 4° to 5° angle so that said front wheels are protected from being caused to tilt outward.

* * * * *